(12) United States Patent
Bouchet et al.

(10) Patent No.: US 11,050,083 B2
(45) Date of Patent: Jun. 29, 2021

(54) LITHIUM METAL POLYMER BATTERY HAVING A HIGH ENERGY DENSITY

(71) Applicants: BLUE SOLUTIONS, Ergue Gaberic (FR); INSTITUT POLYTECHNIQUE DE GRENOBLE, Grenoble (FR)

(72) Inventors: Renaud Bouchet, La Tronche (FR); Marc Deschamps, Quimper (FR)

(73) Assignees: BLUE SOLUTIONS, Ergue Gaberic (FR); INSTITUT POLYTECHNIQUE DE GRENOBLE, Grenoble (FR)

( * ) Notice: Subject to any disclaimer, the term of this patent is extended or adjusted under 35 U.S.C. 154(b) by 176 days.

(21) Appl. No.: 16/085,345

(22) PCT Filed: Mar. 17, 2017

(86) PCT No.: PCT/FR2017/050630
§ 371 (c)(1),
(2) Date: Sep. 14, 2018

(87) PCT Pub. No.: WO2017/158310
PCT Pub. Date: Sep. 21, 2017

(65) Prior Publication Data
US 2019/0088997 A1    Mar. 21, 2019

(30) Foreign Application Priority Data
Mar. 18, 2016  (FR) ...................... 16 52306

(51) Int. Cl.
*H01M 10/0525* (2010.01)
*H01M 10/0565* (2010.01)
(Continued)

(52) U.S. Cl.
CPC ....... *H01M 10/0565* (2013.01); *H01M 4/382* (2013.01); *H01M 4/5825* (2013.01);
(Continued)

(58) Field of Classification Search
CPC combination set(s) only.
See application file for complete search history.

(56) References Cited

U.S. PATENT DOCUMENTS

2006/0102869 A1*  5/2006  Cavaille .............. H01M 8/1051
                                                      252/62.2
2007/0092803 A1*  4/2007  Nakanishi ......... H01M 10/0567
                                                      429/326
(Continued)

FOREIGN PATENT DOCUMENTS

JP     2012248378        12/2012
KR   1020140061501    *   5/2014

OTHER PUBLICATIONS

Huang et. al. J. Mater. Chem. A, 2014, 2, 18831-18837 (Year: 2014).*
(Continued)

*Primary Examiner* — Alexander Usyatinsky
(74) *Attorney, Agent, or Firm* — Greer, Burns & Crain, Ltd.

(57) ABSTRACT

The present invention relates to a high energy density lithium metal polymer (LMP) battery comprising a positive electrode that includes a high potential positive electrode active material and a block copolymer of AB or BAB type, A being an ethylene oxide block and B being an anionic polymer block based on lithium bis(trifluoromethylsulfonyl) imide.

15 Claims, 3 Drawing Sheets

(51) Int. Cl.
  *H01M 4/38*   (2006.01)
  *H01M 4/58*   (2010.01)
  *H01M 10/052*   (2010.01)
  *H01M 10/0569*   (2010.01)
  *H01M 10/0562*   (2010.01)
  *H01M 4/40*   (2006.01)

(52) U.S. Cl.
  CPC ..... *H01M 10/052* (2013.01); *H01M 10/0525* (2013.01); *H01M 10/0562* (2013.01); *H01M 10/0569* (2013.01); *H01M 4/405* (2013.01); *Y02T 10/70* (2013.01)

(56) References Cited

U.S. PATENT DOCUMENTS

| | | | | |
|---|---|---|---|---|
| 2010/0084615 | A1* | 4/2010 | Levasseur | H01M 4/136 252/506 |
| 2011/0311872 | A1* | 12/2011 | Oh | H01M 4/505 429/219 |
| 2012/0202114 | A1* | 8/2012 | Madray | H01M 4/1397 429/211 |
| 2012/0301780 | A1* | 11/2012 | Kitagawa | H01M 4/366 429/211 |
| 2014/0272600 | A1* | 9/2014 | Bouchet | C08F 293/005 429/305 |

OTHER PUBLICATIONS

The decision of EPO to grant a Patent (Year: 2020).*
The decision of KRO to grant a Patent (Year: 2020).*
Jian Gao et al: "Brief overview of electrochemical potential in lithium ion batteries", Topical Review chin. Phys. B vol. 25, No. 1. May 15, 2015.
Korean Office Action dated Jan. 21, 2020.
Renaud Bouchet et al: "Single-ion BAB triblock copolymers as highly efficient electrolytes for lithium-metal batteries", Nature Materials vol. 12, No. 5, Mar. 31, 2013.
Feng Shaowei et al: "Single lithium-ion conducting polymer electrolytes based on poly[(4-styrenesulfonyl)(trifluoromethanesulfonyl)imide] anions", Electrochimica Acta, Elsevier Science Publishers, Barking, GB. Jan. 30, 2013.
Pan Qiyun et al: "Construction of a lithium ion transport network in cathode with lithiated bis(benzene sulfonyl)imide based single ion polymer ionomers" Journal of Power Sources. Feb. 26, 2015.
International Search Report dated Nov. 8, 2016.

* cited by examiner

LITHIUM METAL POLYMER BATTERY HAVING A HIGH ENERGY DENSITY

RELATED APPLICATION

This application is a National Phase of PCT/FR2017/050630, filed on Mar. 17, 2017, which claims the benefit of priority from French Patent Application No. 16 52306, filed on Mar. 18, 2016, the entirety of which are incorporated by reference.

BACKGROUND

Field of the Invention

The present invention relates to a high energy density Lithium Metal Polymer (LMP) battery comprising a positive electrode that includes a high potential positive electrode active material and a block copolymer of AB or BAB type, A being an ethylene oxide block and B being an anionic polymer block based on lithium bis(trifluoromethylsulfonyl) imide.

It applies in particular to the field of electric and hybrid vehicles, in which there is an increasing demand for autonomous and high energy density systems which guarantee a low environmental impact.

DESCRIPTION OF RELATED ART

The Lithium Metal Polymer batteries currently on the market are in the form of a thin film rolled up several times or of several stacked thin films. This rolled-up or stacked thin film has a thickness of the order of around a hundred micrometres and comprises: a negative electrode (anode) ensuring the provision of the lithium ions during the discharge; a positive electrode (cathode) acting as a receptacle where the lithium ions are intercalated; a lithium-ion-conductive solid polymer electrolyte located between the positive electrode and the negative electrode; and a current collector connected to the positive electrode in order to ensure the electrical connection. The negative electrode generally consists of a sheet of lithium metal or of a lithium alloy; the solid polymer electrolyte is generally composed of a polymer based on poly(ethylene oxide) (PEO) and at least one lithium salt; the positive electrode is customarily a material having a working potential that is less than 3.7-3.8 V vs $Li^{3 0}/Li$ (i.e. the insertion/deinsertion potential of the lithium is less than 3.7-3.8 V vs $Li^+/Li$) such as for example $LiFePO_4$ (potential of 3.43 V vs $Li^+/Li$); and the current collector generally consists of a metal sheet. The conductivity of the ions is ensured by the dissolving of the lithium salt in the poly(ethylene oxide). High molecular weight PEO doped with lithium salt has very good mechanical properties at ambient temperature, but is also a semicrystalline polymer. The crystalline structure restricts the mobility of the chains and reduces the ionic conductivity of the polymer. Above the melting temperature of PEO ($T_m$~60-65° C.), the ionic conductivity increases considerably, but at these temperatures, PEO becomes a viscous liquid and loses its dimensional stability. Thus, although PEO is a very good ion conductor, and easy to formulate, it does not have sufficient mechanical strength at the temperatures customarily used in an LMP battery (60-80° C.).

Other polymers based on poly(ethylene oxide) (PEO) have been described, such as statistical copolymers of poly(ethylene oxide-stat-propylene oxide) (i.e. PEO-stat-PPO) type, block copolymers of polystyrene-b-PEO (i.e. PS-b-PEO) type, crosslinked PEOs or copolymers comprising acrylate or methacrylate chains on which PEO is branched. Furthermore, it is known to add, to the PEO-based polymer, inorganic or organic particles, optionally nanoparticles, such as aluminium oxide or titanium oxide particles or cellulose nanofibrils. However, these optionally composite polymer materials replacing the PEO in the solid polymer electrolyte mainly aim to strengthen the mechanical properties of the solid polymer electrolyte and/or to break the crystallinity of the PEO in order to obtain a better low-temperature conductivity and/or a barrier to dendritic growth and do not make it possible to improve the energy density of the battery.

Furthermore, in the aforementioned solid polymer electrolytes, the lithium salt is dissolved in a PEO polymer matrix and the charge fraction borne by $Li^+$ (also referred to as cation transport number) is low (<20%), owing to the strong interaction between the lithium cation and the PEO chains, which limits the electrical performance. The value of the cation transport number determines the portion of current transported by the cation. A low cation transport number leads to the formation of a salt concentration gradient in the thickness of the electrolyte during the operation of the battery. This behaviour gives rise to salt depletion at the electrode, inducing an increase in the resistance of the electrolyte and reduced power performance, and favours the formation of lithium dendrites, bringing about a drop in the Faraday efficiency and ultimately short circuits.

In order to resolve this problem, international application WO 2013/034848 describes diblock copolymers of AB type or triblock copolymers of BAB type, in which the A block is an unsubstituted polyoxyethylene chain having a number-average molecular weight of less than or equal to 100 kDa and the B block is an anionic polymer capable of being prepared from one or more monomers chosen from vinyl monomers and derivatives, said monomers being substituted by the anion of a lithium sulfonyl(trifluoromethylsulfonyl) imide (TFSILi) salt of formula (I) below:

(I)

in which * represents the point of attachment of the anion of said salt or formula (I) to said monomer by means of a covalent bond or a linear alkyl chain having from 1 to 5 carbon atoms.

International application WO 2013/034848 also describes a lithium metal polymer battery comprising the following components: a negative electrode consisting of lithium metal, a solid polymer electrolyte consisting of one of the aforementioned triblock copolymers of BAB type, and a positive electrode consisting of 60% by weight of $LiFePO_4$, 8% by weight of carbon black and 32% by weight of said triblock copolymer. However, the energy density of such a battery is not optimized (e.g. density of 515 Wh/kg approximately relative to the weight of active material). Furthermore, the aforementioned PEO-based diblock copolymers of AB type or triblock copolymers of BAB type, although having a transport number equal to 1, have a lower ionic conductivity than PEO alone.

At the same time, research is directed towards the modification of the positive electrode active material in an LMP battery comprising, as solid polymer electrolyte, a PEO-based polymer and a lithium salt. However, tests in a complete LMP battery are not very common and are essentially limited to the use of active materials having a low potential vs $Li^+/Li$ (i.e. with a potential of less than 3.7 V, and preferably less than 3.8 V). This is because PEO-based polymer materials decompose/oxidize generally above 3.7-3.8 V vs $Li^+/Li$, leading to an irreversible degradation of the battery performance. Consequently, when a positive electrode active material having a potential greater than or equal to 3.7-3.8 V vs $Li^+/Li$ is used, such as $LiFe_xMn_{1-x}PO_4$ in which $0<x<1$ (potential of 4.25 V vs $Li^+/Li$ at end of charge), a rapid drop in capacity is observed as is demonstrated in comparative example 2 of the present application and as described below. Consequently, it is not yet possible to take advantage of active materials operating at a higher potential than that of $LiFePO_4$ (potential of 3.43 V vs $Li^+/Li$), since PEO-based solid polymer electrolytes are known to lead to a limited service life of the system.

OBJECTS AND SUMMARY

Consequently, no prior art describes the modification both of the active material and of the solid polymer electrolyte, in order to improve the performance of an LMP battery in terms of energy density, while guaranteeing a good cycling resistance.

Thus, the objective of the present invention is to overcome the drawbacks of the aforementioned prior art and to provide a high energy density lithium metal polymer battery which guarantees a good cycling stability (i.e. capable of operating over a large number of cycles).

The objective of the invention is achieved by the LMP battery which will be described below.

Specifically, the inventors of the present application have surprisingly discovered that it was possible to combine, within an LMP battery, a positive electrode material having high $Li^+$ ion insertion/deinsertion potential with a PEO-based solid polymer electrolyte that does not decompose or that does not oxidize in the electrochemical window of use of the cell, said positive electrode material having a surface chemistry that is compatible with the PEO-based solid polymer electrolyte.

One subject of the present invention is therefore an LMP (lithium metal polymer) battery comprising:
- at least one negative electrode comprising lithium metal or a lithium metal alloy,
- at least one positive electrode comprising at least one active material, the potential of which is greater than 3.7 V vs $Li^+/Li$, and preferably greater than 3.8 V vs $Li^+/Li$, and more preferably greater than or equal to 4 V, at least one block copolymer $P_1$ and at least one agent generating an electronic conductivity, said positive electrode being optionally supported by a current collector, and
- at least one solid polymer electrolyte comprising:
- at least one block copolymer $P_1$, or
- at least one lithium salt and at least one polymer material based on poly(ethylene oxide) (PEO) chosen from a polystyrene-poly(ethylene oxide) block copolymer (PS-b-PEO), a polystyrene-poly(ethylene oxide)-polystyrene block copolymer (PS-b-PEO-b-PS), a poly(ethylene oxide-stat-propylene oxide) statistical copolymer (i.e. PEO-stat-PPO) combined with a reinforcing agent, a poly(ethylene oxide-stat-butylene oxide) statistical copolymer (i.e. PEO-stat-PBO) combined with a reinforcing agent and a poly(ethylene oxide) combined with a reinforcing agent, said reinforcing agent being chosen from cellulose nanofibrils, ceramic nanoparticles such as titanium oxide, aluminium oxide or silicon oxide nanoparticles and a fluorinated polymer or copolymer such as polyvinylidene fluoride or the vinylidene fluoride-hexafluoropropylene copolymer, said lithium metal polymer battery being characterized in that:
the active material of the positive electrode is chosen from:
(1) active materials of olivine type chosen from those of formula $LiT_tT'_{1-t}PO_4$ in which $0<t<1$ and T and T' are different and are chosen from Fe, Mn, Co, Ni and Ti, in particular those of formula $LiFe_xMn_{1-x}PO_4$ in which $0<x\leq0.4$ and those of formula $LiMg_yMn_{1-y}PO_4$ in which $0<y\leq0.2$,
(2) active materials of fluorophosphate type such as $LiVPO_4F$, and
(3) active materials of $LiMO_2$ lamellar oxide type with M representing a mixture of at least two metals chosen from Al, Ni, Mn and Co, such as $LiNi_{1/3}Mn_{1/3}Co_{1/3}O_2$ (NMC family), $LiNi_{0.8}Co_{0.15}Al_{0.05}O_2$ (NCA family) or $LiNi_{0.5}Mn_{0.5}O_2$, and the block copolymer $P_1$ is a diblock copolymer of AB type or triblock copolymer of BAB type in which the A block is an unsubstituted polyoxyethylene chain having a number-average molecular weight of less than or equal to 100 kDa approximately; and the B block is an anionic polymer capable of being prepared from one or more vinyl monomers substituted by the anion of a lithium sulfonyl(trifluoromethylsulfonyl)imide (TFSILi) salt of formula (I) below:

in which * represents the point of attachment of said anion of formula (I) to said vinyl monomer by means of a covalent bond, a linear, optionally perfluorinated, alkyl chain having from 1 to 5 carbon atoms or a linear, optionally perfluorinated, alkoxy chain having from 1 to 5 carbon atoms, and preferably by means of a covalent bond.

In the present invention, the expression "linear alkoxy chain having from 1 to 5 carbon atoms" means a linear alkyl chain having from 1 to 5 carbon atoms and further comprising one or more oxygen atoms in said alkyl chain.

In the present invention, the expression "an active material, the potential of which is greater than 3.7 V vs $Li^+/Li$" means that the maximum potential of the active material, during the charging or discharging of the battery, is greater than 3.7 V vs $Li^+/Li$.

Preferably, the active material as defined in the invention has a potential of less than 4.3 V vs $Li^+/Li$. This means that the maximum potential of the active material, during the charging or discharging of the battery, is preferably less than 4.3 V vs $Li^+/Li$.

In the LMP battery of the invention, the positive electrode materials selected are capable of withstanding high voltages (greater than 3.7-3.8 V vs Li$^+$/Li) and the polymer materials selected for the positive electrode and the solid polymer electrolyte do not decompose in the electrochemical window of use of the cell and are compatible with the active materials selected. Furthermore, the block copolymer $P_1$ has a cation transport number close to unity, which makes it possible to reduce the polarization at the electrodes during the rapid charging and discharging steps and thus to obtain a greater power density, while preventing dendrite nucleation. Furthermore, the LMP battery of the invention makes it possible to perform many cycles at quite drastic rates with a charge stop limit at 4.3 V vs Li$^+$/Li, without the capacity plummeting. The battery of the invention therefore constitutes a good compromise for guaranteeing a good cycling resistance and good power performance and energy density performance.

The block copolymer $P_1$ exhibits phase nanoseparation with domains predominantly composed of PEO and domains predominantly composed of PVTFSILi (PV signifies vinyl polymer, i.e. polymer obtained from vinyl monomers). The presence of the particular lithium salt TFSILi improves the stability of the block copolymer $P_1$, in particular at high voltages vs Li$^+$/Li. The PEO phase has ion transport properties within the battery and the PVTFSILi polar phase is preferentially positioned on the side of the positive electrode in order to form a stable and unreactive nanometric interfacial layer between the positive electrode active material and the PEO phase. By means of this layer, the PEO phase, which provides ionic conduction within the solid polymer electrolyte and the positive electrode, does not suffer the deleterious effects linked to the potential at the surface of the electrode.

In the block copolymers $P_1$ in accordance with the invention of the positive electrode (respectively of the solid polymer electrolyte), the anion of the salt of formula (I) is attached to the chain constituting the B block, either directly by means of a covalent bond, or by means of an optionally perfluorinated alkyl or alkoxy chain. The only ion which is mobile after dissociation of the copolymer is the Li$^+$ cation, which gives the copolymer specific properties (good conductivity, transport number of the Li$^+$ cations (t$^+$) close to 1) while also having good mechanical strength.

According to the invention, the A block of the block copolymer $P_1$ of the positive electrode (respectively of the solid polymer electrolyte) comprises preferably from 225 to 2250 ethylene oxide units, and more preferentially still from 500 to 1150 ethylene oxide units. One very particularly preferred value is 795 ethylene oxide units.

The average molecular weight of the A block of the block copolymer $P_1$ of the positive electrode (respectively of the solid polymer electrolyte) is always less than or equal to 100 kDa approximately, and varies preferentially from 10 to 60 kDa approximately and more preferentially still from 15 to 50 kDa approximately.

Since the polyoxyethylene chain of the block copolymer $P_1$ of the positive electrode (respectively of the solid polymer electrolyte) is unsubstituted, this means that the PEO within the copolymer is linear. Such a configuration makes it possible to guarantee a good mechanical strength of the electrolyte and of the composite electrode.

The vinyl monomers substituted by the anion of a lithium sulfonyl(trifluoromethylsulfonyl)imide (TFSILi) salt of formula (I) of the block copolymer $P_1$ of the positive electrode (respectively of the solid polymer electrolyte) may be aromatic or nonaromatic vinyl monomers.

As examples of aromatic vinyl monomers, mention may be made of lithium styrene sulfonyl(trifluoromethylsulfonyl)imide and derivatives thereof, in particular the derivatives in which the phenyl group of the styrene is substituted with one or more groups chosen from methyl, ethyl or tert-butyl groups, a bromine atom and a chlorine atom.

The lithium styrene sulfonyl(trifluoromethylsulfonyl)imide is preferred and can be represented by the formula (II-a) below:

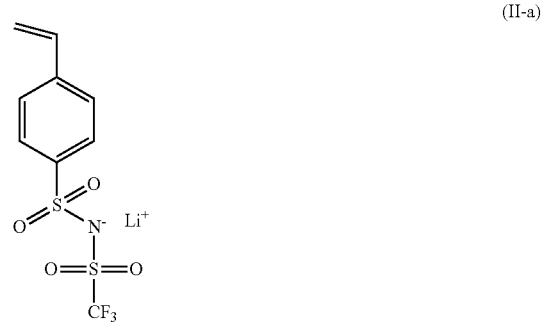 [SMILES: C=Cc1ccc(S(=O)(=O)[N-]S(=O)(=O)C(F)(F)F)cc1 ; [Li+]]

(II-a)

As examples of nonaromatic vinyl monomers, mention may be made of lithium sulfonyl(trifluoromethylsulfonyl) imide acrylate, lithium sulfonyl-(trifluoromethylsulfonyl) imide methacrylate, lithium sulfonyl(trifluoromethyl-sulfonyl)imide acrylamide, lithium sulfonyl (trifluoromethylsulfonyl)imide methacrylamide, lithium ethylene-sulfonyl(trifluoromethylsulfonyl)imide, lithium propylene-sulfonyl(trifluoromethylsulfonyl)imide, lithium diene-sulfonyl(trifluoromethylsulfonyl)imides and lithium maleimide-sulfonyl(trifluoro-methylsulfonyl)imide.

The lithium sulfonyl(trifluoromethylsulfonyl)imide methacrylate is preferred and can be represented by the formula (II-b) below:

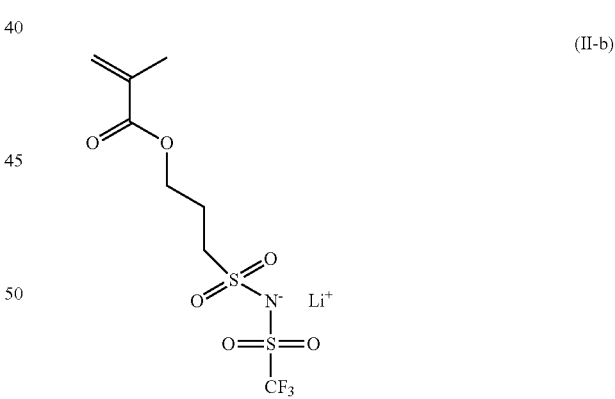

(II-b)

The B block of the block copolymer $P_1$ of the positive electrode (respectively of the solid polymer electrolyte) preferably results solely from the polymerization of one or more vinyl monomers substituted by the anion of a lithium sulfonyl(trifluoromethylsulfonyl)imide (TFSILi) salt of formula (I) as defined in the invention.

The aromatic vinyl monomers are preferred.

The block copolymer $P_1$ of the positive electrode (respectively of the solid polymer electrolyte) is preferably a triblock copolymer of BAB type.

According to one preferred embodiment of the invention, the block copolymer $P_1$ of the positive electrode (respectively of the solid polymer electrolyte) is chosen from triblock copolymers of P(STFSILi)-b-PEO-b-P(STFSILi) type. Specifically, such a block copolymer $P_1$ makes it possible to observe an excellent cycling resistance in terms of capacity and coulombic efficiency, in particular when it is used in the positive electrode.

Block copolymers $P_1$ of the positive electrode (respectively of the solid polymer electrolyte) that are particular preferred according to present invention are the P(STFSILi)-b-PEO-b-P(STFSILi) copolymers, in which each of the PSTFSILi blocks has a number-average molecular weight varying from 2000 to 7500 g/mol approximately and the central PEO block has a number-average molecular weight of 35 000 g/mol approximately.

One block copolymer $P_1$ of the positive electrode (respectively of the solid polymer electrolyte) that is even more particularly preferred according to the present invention is the P(STFSILi)-b-PEO-b-P(STFSILi) copolymer, in which each of the PSTFSILi blocks has a number-average molecular weight of 4900 g/mol approximately and the central PEO block has a number-average molecular weight of 35 000 g/mol approximately.

The P(STFSILi)-b-PEO-b-P(STFSILi) block copolymers $P_1$ used of the positive electrode (respectively in the solid polymer electrolyte) may have a P(STFSILi)/PEO ratio varying from 10% to 80% by weight approximately, preferably varying from 46% to 73% by weight approximately, and more preferably from 50% to 70% by weight approximately.

The block copolymers $P_1$ of the positive electrode (respectively of the solid polymer electrolyte) may be prepared by any controlled polymerization method (ATRP (Atom Transfer Radical Polymerization), RAFT (Reversible Addition Fragmentation Chain Transfer), anionic, cationic, NMP (Nitroxide-Mediated Radical Polymerization)),
either directly by using a vinyl monomer as defined in the invention bearing the anion of a potassium sulfonyl(trifluoromethylsulfonyl)imide (TFSIK) salt of formula (I') below:

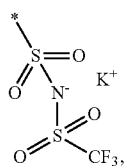

in which * represents the point of attachment of said anion of formula (I') to said monomer by means of a covalent bond, a linear, optionally perfluorinated, alkyl chain having from 1 to 5 carbon atoms or a linear, optionally perfluorinated, alkoxy chain having from 1 to 5 carbon atoms, and preferably by means of a covalent bond,
or indirectly by using a vinyl monomer as defined in the invention (i.e. not substituted by the anion of a potassium sulfonyl(trifluoromethylsulfonyl)imide salt), then by post-functionalization of the polymer obtained [i.e. by grafting of the anion of the salt of formula (I')].

Said polymerization (or the post-functionalization when it exists) can then be followed by an ion exchange step so as to replace the $K^+$ cation with an $Li^+$ cation.

By way of example, when the synthesis is carried out according to the NMP method, it consists in firstly synthesizing a PEO-based macroalkoxyamine then in copolymerizing said macroalkoxyamine and the vinyl monomers bearing an anion of formula (I') as are defined in the invention, then in carrying out an ion exchange so as to replace the $K^+$ cation with an $Li^+$ cation. The synthesis of the PEO-based macroalkoxyamines can be carried out according to the method described in international application WO 2007/113236. The synthesis of the vinyl monomers bearing the anion of formula (I') as are defined in the invention may for example be carried out according to the method described by R. Meziane et al. [*Electrochimica Acta*, 2011, 57, 14-19].

More specifically, it comprises at least the following steps:

i) the copolymerization of the vinyl monomers bearing the anion of formula (I') as are defined in the invention with a macroalkoxyamine of formula (III) below:

$$PEO-(SG1)_n \quad \quad (III)$$

in which:
—n=1 or 2
SG1 is a unit of the formula below:

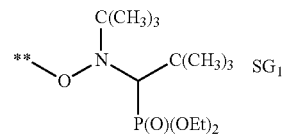

* being the point of attachment of the SG1 units to one of the ends of the PEO unit when n=1 and to each of the ends of the PEO unit when n=2, PEO being a poly(ethylene oxide) chain having a number-average molecular weight of less than 100 kDa approximately; then ii) the exchange of the $K^+$ cations with $Li^+$ cations.

Thus, according to this process, the use of a macroalkoxyamine of formula (III) in which n=1 results in the obtention of a diblock copolymer of AB type and the use of a macroalkoxyamine of formula (III) in which n=2 results in the obtention of a triblock copolymer of BAB type.

The first step is preferably carried out in a polar solvent such as for example N,N-dimethylformamide (DMF), dimethyl sulfoxide (DMSO) or water, at a temperature varying from 80° C. to 120° C. approximately, for a duration of 2 to 20 hours approximately.

The exchange of the cations of step ii) may for example be carried out by means of a dialysis membrane, using a lithium salt such as for example lithium chloride.

When step ii) is completed, the resulting copolymer is then preferably washed to remove the excess lithium salt and optionally the excess vinyl monomer which might not have polymerized, then the solution is preferably evaporated under vacuum to enable the storage of the copolymer.

According to one particularly preferred embodiment of the invention, the solid polymer electrolyte consists of one or more block copolymers $P_1$ as defined in the invention or of a lithium salt and of a polymer material based on poly(ethylene oxide) as are defined in the invention.

According to an embodiment, the solid polymer electrolyte comprises at least one block copolymer $P_1$.

When the solid polymer electrolyte comprises at least one copolymer $P_1$, it preferably does not comprise lithium salts other than those of formula (I) as defined in the invention which are grafted to the B blocks by means of their anions.

When the solid polymer electrolyte comprises at least one lithium salt and at least one polymer material based on poly(ethylene oxide), the preferred polymer material is a poly(ethylene oxide-stat-butylene oxide) (i.e. PEO-stat-PBO) statistical copolymer combined with a fluorinated polymer or copolymer such as a vinylidene fluoride-hexafluoropropylene copolymer.

The solid polymer electrolyte preferably does not comprise plasticizers and/or solvents, such as those conventionally used in gelled polymer electrolytes or in liquid electrolytes (e.g. carbonates).

The lithium salt of the solid polymer electrolyte (when the latter comprises at least one lithium salt and at least one polymer material based on poly(ethylene oxide)) may be chosen from lithium fluorate ($LiFO_3$), lithium bis(trifluoromethanesulfonyl)imide (LiTFSI), lithium hexafluorophosphate ($LiPF_6$), lithium fluoroborate ($LiBF_4$), lithium metaborate ($LiBO_2$), lithium perchlorate ($LiClO_4$) and lithium nitrate ($LiNO_3$), lithium bis(fluorosulfonyl)imide (LiFSI), and mixtures thereof.

LiTFSI is the preferred lithium salt.

The solid polymer electrolyte may in particular be in any appropriate form, for example in the form of a sheet, a film or a membrane. The solid polymer electrolyte may be prepared by any technique known to a person skilled in the art such as for example by coating, by extrusion or by (cold or hot) pressing.

The agent generating an electronic conductivity may be chosen from carbon black, SP carbon, acetylene black, carbon fibres and nanofibres, carbon nanotubes, graphene, graphite, metal particles and fibres and a mixture thereof.

The agent generating an electronic conductivity may represent from 0.1% to 10% by weight approximately, and preferably from 0.1% to 2% by weight approximately, relative to the total weight of the positive electrode.

The positive electrode further comprises at least one block copolymer $P_1$ as defined in the invention, which makes it possible to prevent the formation of a concentration gradient in the thickness of the positive electrode during cycling and thus to improve the power performance of the battery or to increase the grammage of the cathode. This also makes it possible to ensure stable interfaces with the high-potential active material.

The block copolymer $P_1$ as defined in the invention may represent from 15% to 35% by weight approximately, preferably from 18% to 28% by weight approximately, relative to the total weight of the positive electrode.

The block copolymer $P_1$ of the positive electrode may be identical to or different from the block copolymer $P_1$ of the solid polymer electrolyte of the battery. They are preferably identical.

According to one preferred embodiment of the invention, the grammage of the positive electrode (i.e. the amount of positive electrode active material/cm²/surface) is greater than or equal to 0.2 mAh/cm² approximately, and preferably varies from 0.5 to 3.5 mAh/cm² approximately.

The current collector may be a stainless steel or aluminium current collector, optionally covered with a carbon-based layer (anticorrosion layer).

The active material of the positive electrode may represent from 60% to 85% by weight approximately, and preferably from 65% to 80% by weight approximately, relative to the total weight of the positive electrode.

The active material of the positive electrode is a lithium intercalation material. It has a surface chemistry that is compatible with the block copolymer $P_1$ as defined in the invention.

According to one particular preferred embodiment of the invention, the active material of the positive electrode is coated with a layer of carbon.

The carbon coating the active material preferably represents from 0.1% to 5% by weight approximately, relative to the weight of the active material.

The layer of carbon is preferably in the form of a layer having a thickness that varies from 1 to 4 nm approximately.

The presence of the layer of carbon makes it possible to improve the high-potential active material/block copolymer $P_1$ interface and thus to obtain a good cycling resistance, in particular in terms of capacity.

This layer of carbon is generally present on the active materials (1) of olivine type as defined in the invention, in particular in order to compensate for the moderate electronic conductivity of these active materials.

It may also be present on the active materials (3) of lamellar oxide type as defined in the invention.

The active material of the positive electrode is preferably an active material (1) or (3), and more preferably an active material (1) of olivine type as defined in the invention.

The preferred active materials (1) of olivine type are those of formula $LiFe_xMn_{1-x}PO_4$ in which $0<x\leq0.4$, and preferably in which $x=0.2$.

The preferred active materials (3) of lamellar oxide type are those from the NMC family such as $LiNi_{1/3}Mn_{1/3}Co_{1/3}O_2$.

The active material of the positive electrode is a reversible lithium ion active material. In other words, it can reversibly insert or deinsert lithium ions.

The ideal operating temperature of the battery of the invention is from 60° C. to 100° C. approximately.

DETAILED DESCRIPTION

Figure 1:
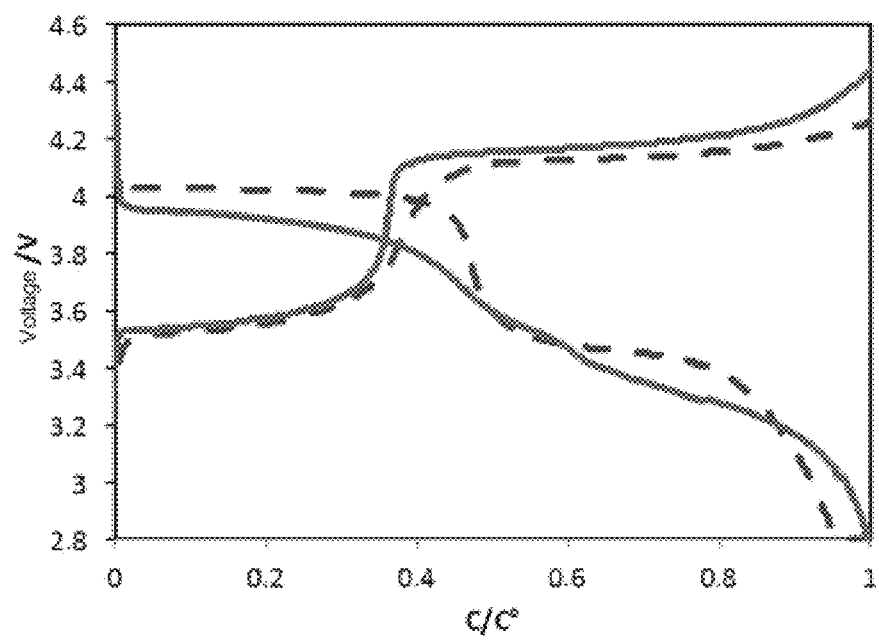
FIG. 1 is a graph of voltage (in volts, V) as a function of $C/C^0$ (C being the capacity restored during cycling in mAh and $C^0$ being the expected total capacity in mAh) at 80° C. for the battery from example 1, in accordance with one embodiment.

The present invention is illustrated by the following exemplary embodiments, to which it is not however limited.

EXAMPLES

Raw materials used in the examples:
oxalyl chloride, anhydrous acetonitrile (Alfa-Aesar),
4-styrenesulfonic acid sodium salt, dimethylformamide (DMF), triethylamine, dimethylaminopyridine (DMAP), lithium chloride, dichloromethane, acryloyl chloride, diethyl ether, tetrahydrofuran (THF) (Sigma-Aldrich),
trifluoromethylsulfonamide (Rhodia),
nitroxide of formula (SG1) (Arkema) below:

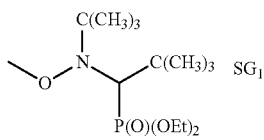

α,ω-hydroxy PEO (Mn=10 000 g/mol) (Sigma-Aldrich),
MAMA-SG1 of formula below (Arkema):

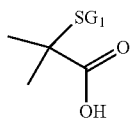

C65 carbon black (Timcal),
stainless steel current collector (Goodfellow),
lithium metal sheet (Blue Solutions).

Example 1: Preparation of a Lithium Metal Polymer Battery in Accordance with the Invention

1) Synthesis of a Triblock Copolymer $P_1$: PSTFSILi-b-PEO-b-PSTFSILi Comprising 28% by Weight of PSTFSILi

1.1) Synthesis of Potassium 4-styrenesulfonyl(trifluoromethylsulfonyl)-imide (STFSIK)

1.1.1) Synthesis of 4-styrenesulfonyl Chloride 2 ml of oxalyl chloride (23.3 mmol) and 0.087 g (1 mmol) of dimethylformamide (DMF) were added to 40 ml of anhydrous acetonitrile. The reaction mixture was stirred for 5 hours to promote the formation of a Vilsmeier-Haack complex (complex between the DMF and the oxalyl chloride $(CH_3)_2N^+=CClH$). Once the solution turned yellow, 4 g of 4-styrenesulfonic acid sodium salt were added slowly to the reaction mixture, under a nitrogen atmosphere and at ambient temperature. The reaction mixture was then stirred for 24 hours at ambient temperature. The precipitate of NaCl formed was removed by filtration. 42 ml of 4-styrenesulfonyl chloride solution were obtained.

$^1$H NMR (300 MHz; DMSO-d6; 298 K): δ ppm 7.59 (d, 2H); 7.44 (d, 2H); 6.72 (q, 1H); 5.84 (d, 1H); 5.27 (d, 1H); 5.27 (d, 1H).

$^{13}$C NMR (75 MHz; DMSO-d6; 298 K): δ ppm 146.91; 137.66; 136.16; 125.93; 125.72; 115.18.

1.1.2) Synthesis of Potassium 4-styrenesulfonyl(trifluoromethyl-sulfonyl)imide (STFSIK)

8.1 ml of triethylamine (28.2 mmol), 2.89 g of trifluoromethyl-sulfonamide (19.4 mmoles) and a catalytic amount of DMAP (approximately 215 mg) were added successively to 30 ml of anhydrous acetonitrile. The reaction mixture was stirred for 1 hour. The 4-styrenesulfonyl chloride solution obtained above in step 1.1.1) was cooled to 0° C., then the reaction medium containing the trifluoromethylsulfonamide was added slowly thereto. The resulting mixture was placed under vigorous magnetic stirring for 16 hours. After evaporation of the solvent, a brown solid was recovered which was then dissolved in 50 ml of dichloromethane. This solution was washed twice with 20 ml of a 4% $NaHCO_3$ aqueous solution and then with 20 ml of 1 M hydrochloric acid. The potassium 4-styrene-sulfonyl(trifluoromethylsulfonyl)imide was obtained by neutralization of the acid monomer using an excess of $K_2CO_3$ in water. The resulting suspension was stirred for 1 hour, filtered and dried to give 4.2 g of the expected product in the form of a light yellow solid. The recrystallization thereof in water gave 3.63 g of powder (yield of approximately 53%).

$^1$H NMR (300 MHz; DMSO-d6; 298 K): δ ppm 7.73 (d, 2H); 7.57 (d, 2H); 6.79 (q, 1H); 5.95 (d, 1H); 5.38 (d, 1H).

$^{13}$C NMR (75 MHz; DMSO-d6; 298 K): δ ppm 144.21; 139.55; 135.57; 126.43; 125.87; 126.36.

1.2) Synthesis of the PEO-diSG1 Macroalkoxyamine

The SG1-MAMA-PEO-MAMA-SG1 (or PEO-diSG1) macroalkoxyamine of the following formula was synthesized:

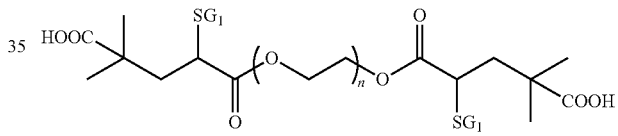

in which formula SG1 is as defined in the invention and the value of n is such that the number-average molar mass (i.e. Mn) of the PEO is 35 000 g/mol.

To do this, 10 g of α,ω-hydroxy PEO (Mn=35 000 g/mol) and 1.4 ml of triethylamine were dissolved in a three-neck round-bottom flask containing 40 ml of dichloromethane. The reaction mixture was degassed by nitrogen bubbling for 20 minutes. Using a dropping funnel, 0.9 ml of acryloyl chloride dissolved (5 eq.) in 10 ml of dichloromethane was then introduced dropwise, at a temperature of 0° C. It was left to react for approximately 15 hours. The reaction mixture was filtered to remove the triethylammonium chloride. The filtrate was washed twice with 20 ml of a saturated $NaHCO_3$ aqueous solution. The organic phase was precipitated from diethyl ether. The PEO diacrylate was recovered by filtration then drying under vacuum. Next, 2 g of PEO diacrylate were introduced into a "Schlenk" flask equipped with a "Rotaflo" stopcock. 0.16 g (4.2 mmol) of MAMA-SG1 of the formula indicated above, dissolved in 6 ml of THF, were introduced over the PEO diacrylate. The suspension was deoxygenated by nitrogen flushing for 30 minutes. The "Schlenk" flask was immersed in an oil bath thermostatically set at 100° C. for 1 hour. The THF was evaporated under vacuum at ambient temperature. The PEO-(MAMA-SG1)2 (or PEO-diSG1) was recovered by precipitation from ether.

The expected PEO-diSG1 was obtained.

1.3) Synthesis of a Triblock Copolymer $P_1$: PSTFSILi-b-PEO-b-PSTFSILi Containing 28% by Weight of PSTFSILi 2.5 g of PEO-diSG1 macroalkoxyamine obtained above in the preceding step 1.2) (i.e. $6.9 \times 10^{-5}$ mol), 1.2 g of STFSIK (i.e. $3.4 \times 10^{-3}$ mol) obtained above in step 1.1), $2.5 \times 10^{-3}$ g of nitroxide of formula SG1 (purity of 85% by weight hence $7.2 \times 10^{-6}$ mol), and 3.5 ml of DMF were placed in a three-neck round-bottom flask equipped with a condenser, a bubbler and a magnetic stirring bar. The mixture was degassed for 20 min by argon flushing in order to remove the oxygen from the reaction medium. The mixture was then heated at 110° C. for 4 h. The polymerization reaction was stopped by immersing the round-bottom flask in an ice bath. The solvent (DMF) was then evaporated under vacuum and is the residue obtained was dissolved in 30 ml of deionized water. The solution obtained was then placed in a dialysis membrane sold under the trade name Cellu-Sep® T2 by the company Orange Scientific, having a retention cutoff (MWCO) of 6000-8000 Da and dialysed with 4×1 litre of lithium chloride solution (0.25 mol/l), in order to perform the exchange of $K^+$ cations by $Li^+$ cations (0.25 mol/l), then with 4×1 litre of deionized water in order to remove the excess lithium chloride. The dialysis step also made it possible to remove the monomer and the DMF remaining. The copolymer solution was then evaporated under vacuum.

The expected block copolymer was obtained by coating, in which copolymer each of the PSTFSILi blocks had a number-average molecular weight of 6800 g/mol (estimated from 28% by weight measured by NMR) and the central PEO block had a number-average molecular weight of 35 000 g/mol, the PSTFSILi block representing 28% by weight of the total weight of the copolymer.

The PSTFSILi-PEO-PSTFSILi triblock copolymer $P_1$ as obtained by coating was in the form of a film having a thickness of 70 μm approximately.

2) Preparation of a Positive Electrode

A positive electrode in the form of a film was prepared in the following way: a mixture of 0.5 g of $LiFe_{0.4}Mn_{0.6}PO_4$, coated with a nanometric layer of carbon (approximately 2 nm thick), and 0.065 g of carbon black was manually ground in cyclohexane for 20 minutes. After drying the resulting mixture, the powder obtained was poured into a solution of PSTFSILi-PEO-PSTFSILi triblock copolymer $P_1$ as prepared in step 1) above dissolved to 10% by weight in a 50/50 solution by volume of dichloromethane/acetonitrile and corresponding to a weight of triblock copolymer $P_1$ of 0.242 g.

The resulting mixture was left under magnetic stirring for 2 hours then degassed for a few seconds under vacuum before being coated on a stainless steel current collector using the doctor blade method that is well known to a person skilled in the art. After evaporation of the solvents, the electrode obtained in the form of a film was dried at 60° C. for 2 hours then at ambient temperature under vacuum for 24 hours and finally stored in a glove box.

The positive electrode obtained comprised 62% by weight of active material, 30% by weight of triblock copolymer $P_1$ and 8% by weight of carbon black. It had a thickness of 12 μm approximately. The grammage obtained was 0.25 mAh/$cm^2$.

3) Preparation of an LMP Battery

An LMP battery was prepared by assembling, in a glove box:
- a film of PSTFSILi-PEO-PSTFSILi triblock copolymer $P_1$ as prepared in step 1) having a thickness of 70 μm,
- a sheet of lithium metal having a thickness of 60 μm approximately, and
- a positive electrode having a thickness of 12 μm approximately as prepared in step 2).

The assembly was then laminated at 3.4 bar and at 80° C. to form a battery. The battery was then sealed in a coffee bag in order to be tested outside of the glove box.

Cycling tests were carried out at 80° C. in a Memmert chamber at 80° C. (±0.2° C.) by means of a Biologic VMP3 potentiostat. The cycling conditions were galvanostatic at C/15, D/10 or D/7. The stop limits when charging were 4.2 or 4.3 V vs $Li^+/Li$ and when discharging were 2.8 V vs $Li^+/Li$.

The appended FIG. 1 shows the voltage (in volts, V) as a function of $C/C^0$ (C being the capacity restored during cycling in mAh and $C^0$ being the expected total capacity in mAh) at 80° C. for the battery in accordance with the invention as prepared in Example 1 (curve with solid line) and for comparison at 25° C. for a battery not in accordance with the invention (curve with dotted line).

The battery not in accordance with the invention comprised a sheet of lithium metal as negative electrode, a Celgard separator impregnated with a solution containing 1 M of $LiPF_6$ in an ethylene carbonate/dimethylcarbonate mixture (1/1 by weight) as liquid electrolyte, and a mixture of 80% by weight of $LiFe_{0.4}Mn_{0.6}PO_4$ coated with a nanometric layer of carbon (approximately 2 nm thick), 10% by weight of C65 carbon black and 10% by weight of PVdF, as positive electrode.

A weaker polarization and much better defined plateaus are observed when discharging with the battery of the invention.

Thus, the use of a solid electrolyte such as that of the invention instead of a liquid electrolyte makes it possible to guarantee good, or even better, electrochemical performance while making it possible to ensure a good mechanical strength within the battery and to avoid all the safety problems linked to the use of a liquid electrolyte.

Figure 2:
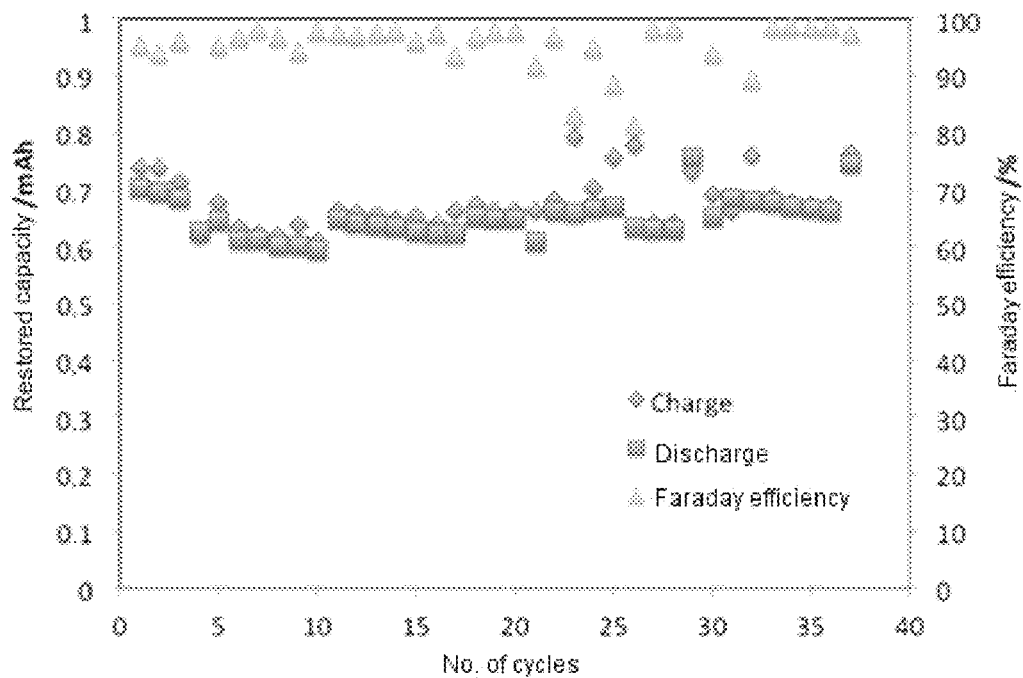
FIG. 2 is a graph showing the capacity (in mAh) as a function of the number of cycles of the battery of the invention during charging (curve with solid lozenges) and during discharging (curve with solid squares) from example 1, in accordance with one embodiment.

The appended FIG. 2 shows the capacity (in mAh) as a function of the number of cycles of the battery of the invention during charging (curve with solid lozenges) and during discharging (curve with solid squares). The curve with solid triangles shows the Faraday efficiency (in %) as a function of the number of cycles of the battery of the invention.

The inventors observed that the tests, when they are repeated several times, are reproducible at least over 60 cycles.

Furthermore, the low-rate cycling conditions used make it possible to obtain restored capacities close to 1 and are particularly drastic relative to the electrochemical stability since in each cycle (C/15, D/10) the solid polymer electrolyte is at a potential greater than 4.1 V vs $Li^+/Li$ for more than 15 hours. This means that after 30 cycles approximately, the solid polymer electrolyte may remain at high potential for more than 450 hours and this at a particularly high temperature of 80° C. With cycling at (C/4, D/2), the number of cycles needed to reach the same residence time at high potential (i.e. 450 hours) would be more than 180 cycles.

Comparative Example 2: Preparation of a Lithium Metal Polymer Battery Not in Accordance with the Invention FIG. 3 shows the restored capacity (in mAh/g) as a function of the number of cycles of a battery not in accordance with the invention.

The battery not in accordance with the invention comprises:
- a sheet of lithium metal as negative electrode,
- a solid polymer electrolyte containing 47.6% by weight of poly(ethylene oxide-co-butylene oxide) (co-P(OE)-(OB), ICPSEB, 115 000 g/mol, Nippon shokubai), 12.4% by weight of LiTFSI, and 40% by weight of PVDF-HFP copolymer (21510, Solvay), and
- a positive electrode containing 74% by weight of $LiFe_{0.4}Mn_{0.6}PO_4$ coated with a nanometric layer of carbon (approximately 2 nm thick) as prepared in Example 1, 0.5% by weight of Ketjenblack carbon black (EC600-jd, AkzoNobel), 20.1% by weight of co-P(OE)-(OB) (ICPSEB, 115 000 g/mol, Nippon shokubai) and 5.4% by weight of LiTFSI.

Figure 3:
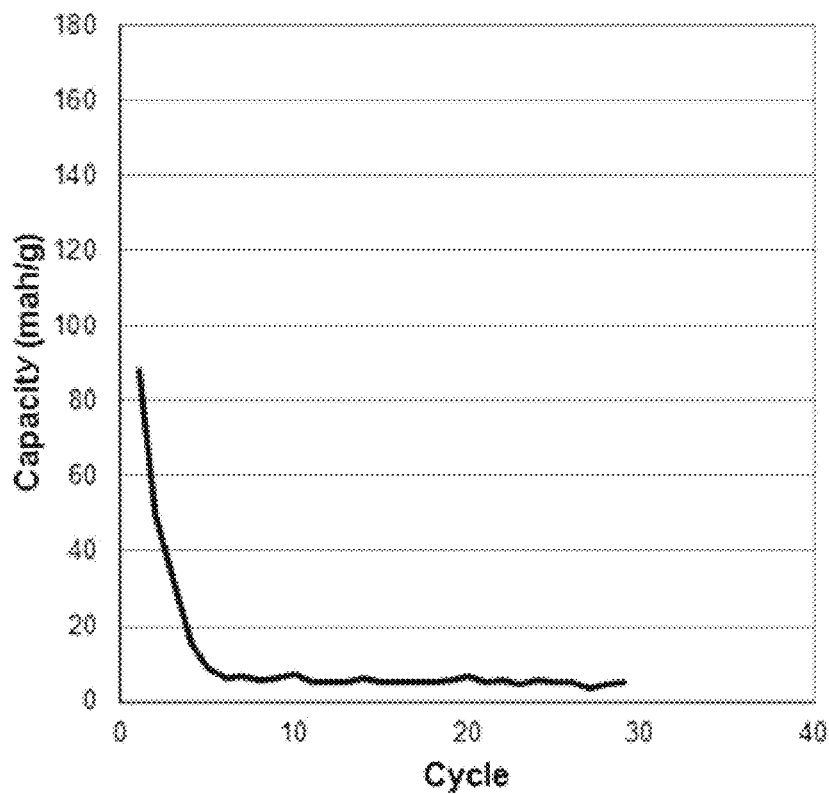
FIG. 3 is a graph that shows the restored capacity (in mAh/g) as a function of the number of cycles of a battery from example 2, not in accordance with the invention.

FIG. 3 shows a rapid drop in capacity.

Example 3: Preparation of Lithium Metal Polymer Batteries in Accordance with the Invention

1) Synthesis of a Triblock Copolymer $P_1'$: PATFSILi-b-PEO-b-PASTFSILi Comprising 33.2% by Weight of PATFSILi

1.1) Synthesis of the Potassium 3-sulfonyl(trifluoromethanesulfonyl)-imide Propyl Acrylate Monomer, ASTFSIK Oxalyl chloride (2.4 ml, 28.3 mmol) and N,N-dimethylformamide (0.50 ml) were added dropwise under argon into a three-neck round-bottom flask containing 30 ml of anhydrous acetonitrile cooled to 0° C. The mixture was stirred for 1 hour at ambient temperature. The solution was then cooled to 0° C. and potassium 3-sulfopropylacrylate monomer (5 g, 21.6 mmol) was added to the solution under argon. The solution was stirred continuously at 0° C. for 3 hours and at ambient temperature for a further 2 hours in order to obtain the formation of 3-(chlorosulfonyl)propyl acrylate. Added dropwise to this solution was a solution of 2.66 g ($1.79 \times 10^{-2}$ mol) of trifluoromethylsulfonamide and 6.80 ml ($4.91 \times 10^{-2}$ mol) of triethylamine dissolved in acetonitrile (10 ml) at 0° C. under argon. The resulting mixture was then left to react at 0° C. for 2 hours and then at ambient temperature for 16 hours under argon. The reaction mixture was filtered and the white solid obtained was washed with acetonitrile. The filtrate was concentrated under vacuum then dissolved in dichloromethane and washed with a 1 M hydrochloric acid solution and a saturated NaCl solution, dried over $MgSO_4$, filtered and evaporated under reduced pressure. The product was obtained in the form of an amber-coloured oil (5.2 g, yield of 68%). The potassium TFSI acrylate monomer was obtained by exchange of cations with potassium carbonate. To do this, $K_2CO_3$ (2 eq.) was added to a 10% solution of triethylammonium-3-sulfonyl (trifluoromethanesulfonyl) imide propyl acrylate (1 eq.) in acetonitrile. The reaction was left at ambient temperature for 24 hours. The solution was then filtered and the solvent was evaporated by a rotary evaporator. The solid obtained was dispersed in dichloromethane and stored at −20° C. for 3 hours. The solid obtained was washed with cold n-pentane, and dried under vacuum in order to obtain a white solid (yield of 60%).

$^1$H NMR (400 MHz, DMSO-d6): δ ppm 6.34 ($CH_2$=CH—, d, 1H), 6.18 ($CH_2$=CH—, dd, 1H), 5.95 ($CH_2$=CH—, d), 4.19 (—O—$CH_2$—, t, 2H), 3.05 (—$CH_2$—$SO_2$—, t, 2H), 2.01 (—$CH_2$—, m, 2H).

$^{13}$C NMR (75 MHz, DMSO-d6): δ ppm 165.87 (C=O), 132.00 ($CH_2$=CH—), 128.71 ($CH_2$=CH—), 125.41-115.74 (—$CF_3$), 63.01 (—$COOCH_2$—), 51.72 (—$CH_2SO_2$—), 23.97 (—$COOCH_2$—).

$^{19}$F NMR (376 MHz, DMSO-d6): δ ppm: −77.54.

HR-MS ($C_7H_9NO_6S_2F_3K$): m/z=[M−K$^{30}$] found=323.9832 g·mol$^{-1}$, [M−K$^{30}$] calculated=323.9829 g·mol$^{-1}$.

1.2) Synthesis of the PEO-diSG1 Macroalkoxyamine

The SG1-MAMA-PEO-MAMA-SG1 (or PEO-diSG1) macroalkoxyamine of the following formula was synthesized:

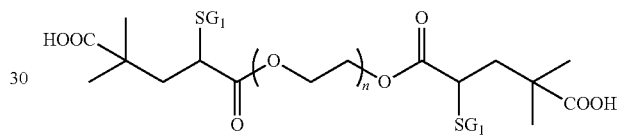

in which formula SG1 is as defined in the invention and the value of n is such that the number-average molar mass (i.e. Mn) of the PEO is 35 000 g/mol.

To do this, 10 g of α,ω-hydroxy PEO (Mn=35 000 g/mol) and 1.4 ml of triethylamine were dissolved in a three-neck round-bottom flask containing 40 ml of dichloromethane. The reaction mixture was degassed by nitrogen bubbling for 20 minutes. Using a dropping funnel, 0.9 ml of acryloyl chloride dissolved (5 eq.) in 10 ml of dichloromethane was then introduced dropwise, at a temperature of 0° C. It was left to react for approximately 15 hours. The reaction mixture was filtered to remove the triethylammonium chloride. The filtrate was washed twice with 20 ml of a saturated $NaHCO_3$ aqueous solution. The organic phase was precipitated from diethyl ether. The PEO diacrylate was recovered by filtration then drying under vacuum. Next, 2 g of PEO diacrylate were introduced into a "Schlenk" flask equipped with a "Rotaflo" stopcock. 0.16 g (4.2 mmol) of MAMA-SG1 of the formula indicated above, dissolved in 6 ml of THF, were introduced over the PEO diacrylate. The suspension was deoxygenated by nitrogen flushing for 30 minutes. The "Schlenk" flask was immersed in an oil bath thermostatically set at 100° C. for 1 hour. The PEO-(MAMA-SG1)2 (or PEO-diSG1) was recovered by precipitation from ether.

The expected PEO-diSG1 was obtained.

1.3) Synthesis of Triblock Copolymer $P_1'$: PATFSILi-b-PEO-b-PATFSILi

The PATFSILi-b-PEO-b-PATFSILi triblock copolymer $P_1'$ was synthesized by controlled radical polymerization, in the presence of nitroxides (NMP), water, the potassium TFSI acrylate prepared previously and the PEO-(MAMASG1)2 macroalkoxyamine prepared previously as initiator at 120° C.

To do this, 1.61 g of potassium TFSI acrylate monomer, 2.6 g of PEO-(MAMASG1)2 macroalkoxyamine and 15 g of water were placed in a "Schlenk" flask equipped with a "Rotaflo" stopcock. When the solids were completely dissolved in the water, the solution was deoxygenated by nitrogen flushing for 30 minutes. The "Schlenk" flask was then immersed in an oil bath thermostatically set at 120° C. for 15 hours.

The unreacted monomer was removed by successive dialyses against a solution of $LiClO_4$ and distilled water. At the same time, the exchange of the $K^+$ ions by the $Li^+$ ions took place. The water was then evaporated, and a PATFSILi-b-PEO-b-PATFSILi triblock copolymer $P_1'$ was obtained having a single pure ion, containing 33.2% by weight of PATFSILi.

2) Preparation of LMP Batteries

Figure 4:
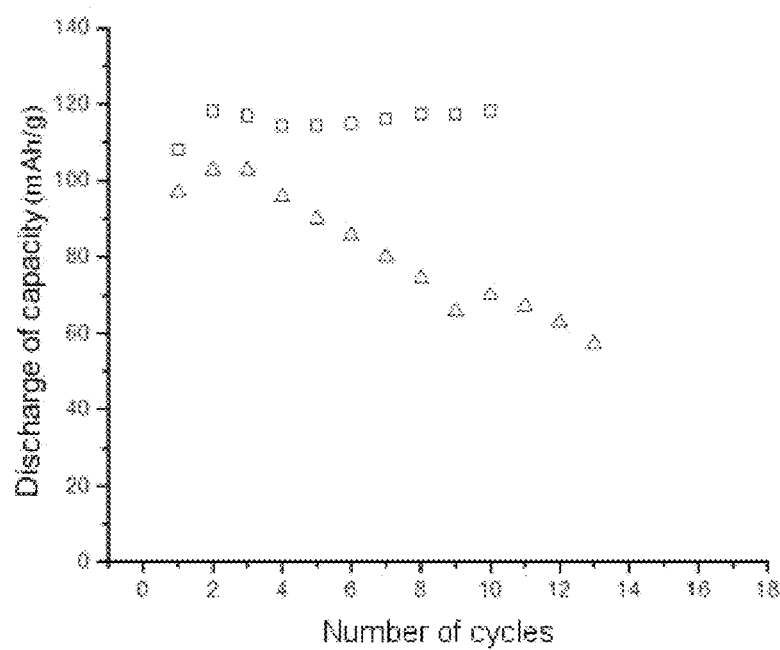
FIG. 4 is a graph shows the capacity (in mAh/g) as a function of the number of cycles of batteries, namely for a first battery (curve with hollow squares) and for a second battery (curve with hollow triangles) from example 3 in accordance with one embodiment.

FIG. 4 shows the capacity (in mAh/g) as a function of the number of cycles of batteries in accordance with the invention during discharging, namely for a first battery (curve with hollow squares) and for a second battery (curve with hollow triangles).

Figure 5:
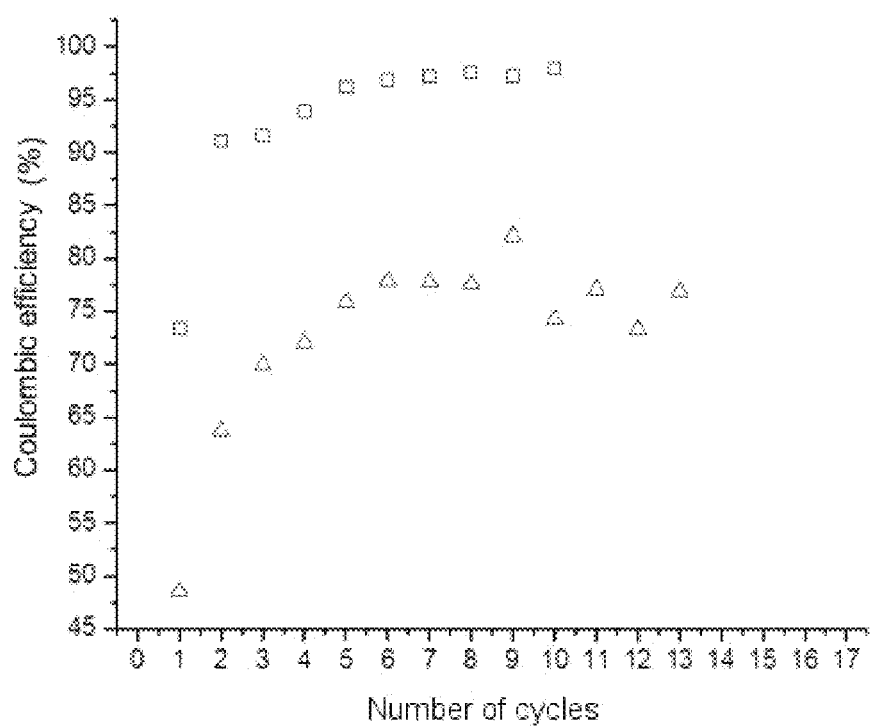
FIG. 5 is a graph that shows the coulombic efficiency (in %) as a function of the number of cycles of the first battery in accordance with the invention (curve with hollow squares) and of the second battery from example 3, in accordance with one embodiment (curve with hollow triangles).

FIG. 5 shows the coulombic efficiency (in %) as a function of the number of cycles of the first battery in accordance with the invention (curve with hollow squares) and of the second battery in accordance with the invention (curve with hollow triangles).

The first battery in accordance with the invention comprised:
- a solid polymer electrolyte containing 47.6% by weight of poly(ethylene oxide-co-butylene oxide) (co-P(OE)-(OB), ICPSEB, 115 000 g/mol, Nippon shokubai), 12.4% by weight of LiTFSI, and 40% by weight of PVDF-HFP copolymer (21510, Solvay),
- a sheet of lithium metal having a thickness of 50 µm approximately, and
- a positive electrode comprising 51.4% by weight of $LiFe_{0.4}Mn_{0.6}PO_4$ active material coated with a nanometric layer of carbon (approximately 2 nm thick), 41.1% by weight of PSTFSILi-PEO-PSTFSILi block copolymer $P_1$ as prepared in step 1) of Example 1, and 7.5% by weight of carbon black.

The second battery in accordance with the invention comprised:
- a solid polymer electrolyte containing 47.6% by weight of poly(ethylene oxide-co-butylene oxide) (co-P(OE)-(OB), ICPSEB, 115 000 g/mol, Nippon shokubai), 12.4% by weight of LiTFSI, and 40% by weight of PVDF-HFP copolymer (21510, Solvay),
- a sheet of lithium metal having a thickness of 50 µm approximately, and
- a positive electrode comprising 65% by weight by weight of $LiFe_{0.4}Mn_{0.6}PO_4$ active material coated with a nanometric layer of carbon (approximately 2 nm thick), 27% by weight of PATFSILi-PEO-PATFSILi triblock copolymer $P_1'$ (33.2% by weight of PATFSILi) as prepared in step 1) of Example 3, and 8% by weight of carbon black.

FIGS. 4 and 5 show that the PSTFSILi-PEO-PSTFSILi block copolymer $P_1$ in the positive electrode improves the cycling resistance performance, in particular in terms of capacity and coulombic efficiency.

The invention claimed is:

1. Lithium metal polymer battery comprising:
   at least one negative electrode comprising lithium metal or a lithium metal alloy,
   at least one positive electrode comprising at least one active material, the potential of which is greater than 3.7 V vs Li+/Li, at least one block copolymer P1 and at least one agent generating an electronic conductivity, said positive electrode being optionally supported by a current collector, and
   at least one solid polymer electrolyte comprising:
   at least one block copolymer P1, or
   at least one lithium salt and at least one polymer material based on poly(ethylene oxide) chosen from a polystyrene-poly(ethylene oxide) block copolymer, a polystyrene-poly(ethylene oxide)-polystyrene block copolymer, a poly(ethylene oxide-stat-propylene oxide) statistical copolymer combined with a reinforcing agent, a poly(ethylene oxide-stat-butylene oxide) statistical copolymer combined with a reinforcing agent and a poly(ethylene oxide) combined with a reinforcing agent,
   said reinforcing agent being chosen from cellulose nanofibrils, ceramic nanoparticles and a fluorinated polymer or copolymer,
   wherein in said lithium metal polymer battery:
   the active material of the positive electrode having a potential greater than 3.7 V vs Li+/Li, is chosen from the following:
   (1) active materials of olivine type chosen from those of formula $LiTtT'_{1-t}PO_4$ in which $0<t<1$ and T and T' are different and are chosen from Fe, Mn, Co, Ni and Ti and those of formula $LiMg_yMn_{1-y}PO_4$ in which $0<y\leq0.2$,
   (2) active materials of fluorophosphate type, and
   (3) active materials of $LiMO_2$ lamellar oxide type with M representing a mixture of at least two metals chosen from Al, Ni, Mn and Co, and
   the block copolymer P1 is a diblock copolymer of AB type or triblock copolymer of BAB type in which the A block is an unsubstituted polyoxyethylene chain having a number-average molecular weight of less than or equal to 100 kDa; and the B block is an anionic polymer capable of being prepared from one or more vinyl monomers substituted by the anion of a lithium sulfonyl(trifluoromethylsulfonyl)imide (TFSILi) salt of formula (I) below:

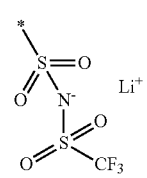

(I)

in which * represents the point of attachment of said anion of formula (I) to said vinyl monomer by means of a covalent bond, a linear alkyl chain having from 1 to 5 carbon atoms or a linear alkoxy chain having from 1 to 5 carbon atoms.

2. Battery according to claim 1, wherein the A block of the block copolymer $P_1$ of the positive electrode and of the solid polymer electrolyte comprises from 225 to 2250 ethylene oxide units.

3. Battery according to claim 1, wherein average molecular weight of the A block of the block copolymer $P_1$ of the positive electrode and of the solid polymer electrolyte varies from 10 to 60 kDa.

4. Battery according to claim 1, wherein the vinyl monomers of the block copolymer $P_1$ of the positive electrode and of the solid polymer electrolyte are aromatic vinyl monomers chosen from lithium styrene sulfonyl(trifluoromethylsulfonyl)imide and derivatives thereof.

5. Battery according to claim 1, wherein the block copolymer $P_1$ of the positive electrode is chosen from triblock copolymers of P(STFSILi)-b-PEO-b-P(STFSILi) type.

6. Battery according to claim 5, wherein the P(STFSILi)/PEO ratio of the block copolymer $P_1$ of the positive electrode varies from 50% to 70% by weight.

7. Battery according to any one of claim 1, wherein the vinyl monomers of the block copolymer P1 of the positive electrode and of the solid polymer electrolyte are nonaromatic vinyl monomers chosen from lithium sulfonyl(trifluoromethylsulfonyl)imide acrylate, lithium sulfonyl(trifluoromethylsulfonyl)imide methacrylate, lithium sulfonyl(trifluoromethylsulfonyl)imide acrylamide, lithium sulfonyl(trifluoromethylsulfonyl)imide methacrylamide, lithium ethylene-sulfonyl(trifluoromethylsulfonyl)imide, lithium propylene-sulfonyl(trifluoromethylsulfonyl)imide, and lithium diene-sulfonyl(trifluoromethylsulfonyl)imides and lithium maleimide-sulfonyl(trifluoromethylsulfonyl)imide.

8. Battery according to claim 1, wherein the solid polymer electrolyte comprises at least one block copolymer $P_1$ and does not comprise lithium salts other than those of formula (I) as defined in claim 1 which are grafted to the B blocks by means of their anions.

9. Battery according to claim 1, wherein the solid polymer electrolyte comprises at least one poly(ethylene oxide-stat-butylene oxide) statistical copolymer combined with a fluorinated polymer or copolymer.

10. Battery according to claim 1, wherein the solid polymer electrolyte does not comprise plasticizers and/or solvents.

11. Battery according to claim 1, wherein the agent generating an electronic conductivity is chosen from carbon black, SP carbon, acetylene black, carbon fibres and nanofibres, carbon nanotubes, graphene, graphite, metal particles and fibres and a mixture thereof.

12. Battery according to claim 1, wherein the agent generating an electronic conductivity represents from 0.1% to 10% by weight, relative to the total weight of the positive electrode.

13. Battery according to claim 1, wherein the block copolymer $P_1$ represents from 15% to 35% by weight, relative to the total weight of the positive electrode.

14. Battery according to claim 1, wherein the active material of the positive electrode represents from 60% to 85% by weight, relative to the total weight of the positive electrode.

15. Battery according to claim 1, wherein the active material of the positive electrode is an active material of formula $LiFe_xMn_{1-x}PO_4$ in which $0<x\leq0.4$.

* * * * *